Figure 1:
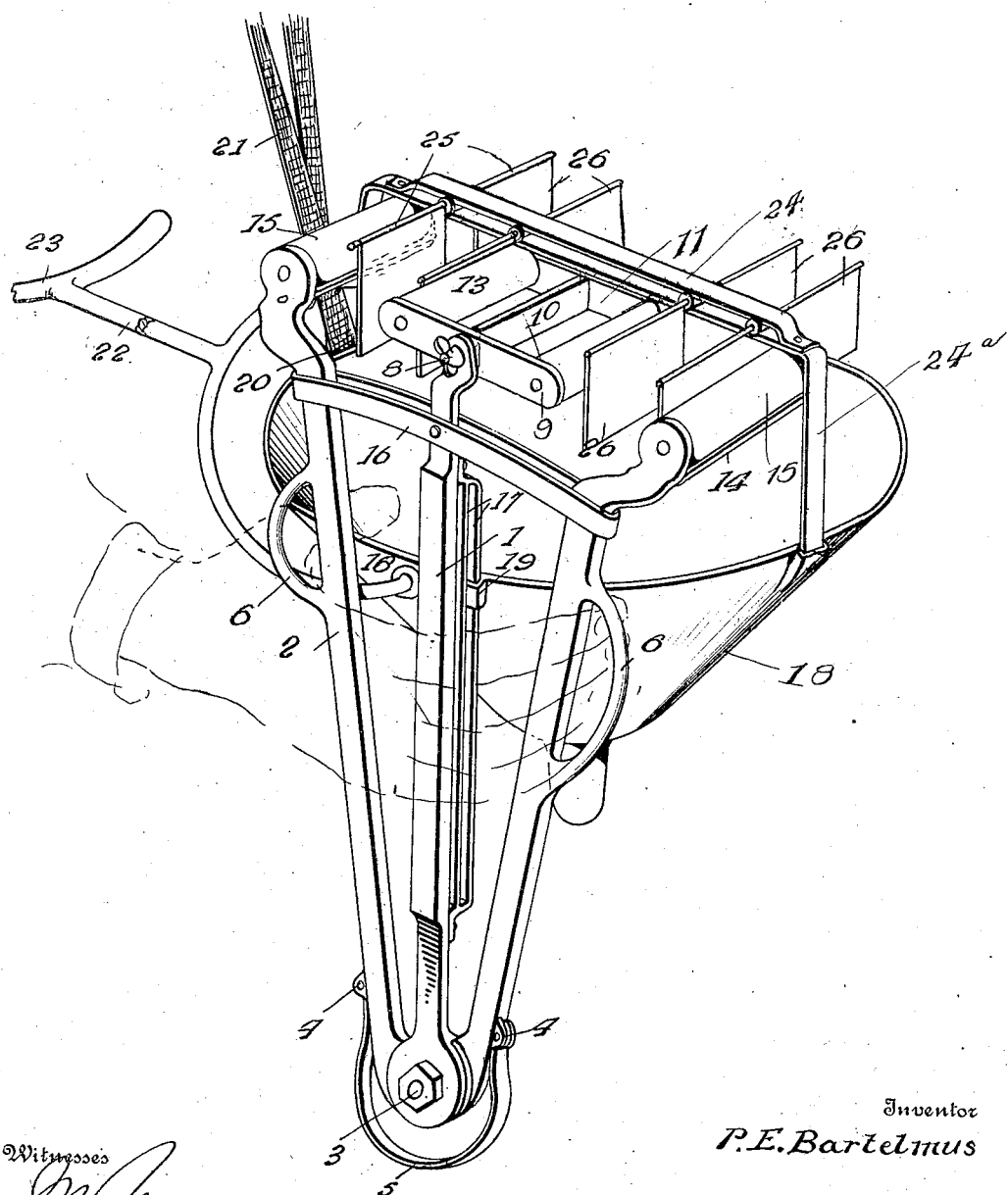

No. 833,500. PATENTED OCT. 16, 1906.
P. E. BARTELMUS.
MILKING APPARATUS.
APPLICATION FILED FEB. 23, 1906.

2 SHEETS—SHEET 1.

Witnesses

Inventor
P. E. Bartelmus
By R. A. B. Lacey, Attorneys

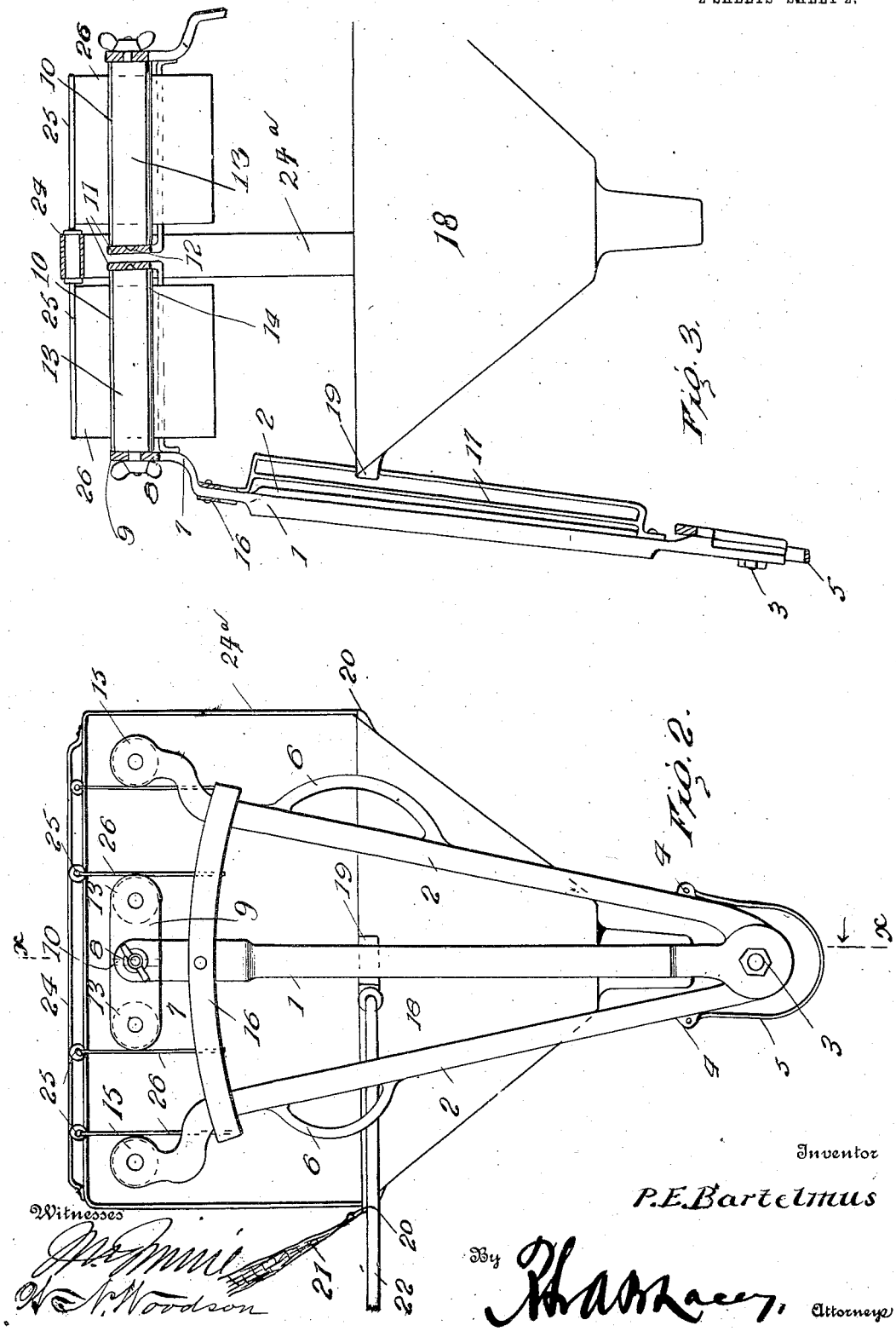

UNITED STATES PATENT OFFICE.

PAUL E. BARTELMUS, OF PENDLETON, OREGON.

MILKING APPARATUS.

No. 833,500.  Specification of Letters Patent.  Patented Oct. 16, 1906.

Application filed February 23, 1906. Serial No. 302,557.

*To all whom it may concern:*

Be it known that I, PAUL E. BARTELMUS, a citizen of the United States, residing at Pendleton, in the county of Umatilla and State of Oregon, have invented certain new and useful Improvements in Milking Apparatuses, of which the following is a specification.

This invention relates to certain new and useful improvements in milking apparatus.

The object of the invention is to provide improved implements for use in the milking operation which will result in comfort to the cow and avoid any injury to the udder or teats, which will embody hygienic features resulting from the cleanliness that is possible by the use of my invention, and which will relieve the person milking from undue exertion and which will not require the strength of hand ordinarily required when the milking operation is performed by the hand alone.

For a full description of the invention and the merits thereof and also to acquire a knowledge of the details of construction of the means for effecting the result reference is to be had to the following description and accompanying drawings, in which—

Figure 1 is a perspective view illustrating the improvements of my invention. Fig. 2 is a side view thereof. Fig. 3 is a transverse sectional view on the line X X of Fig. 2.

Corresponding and like parts are referred to in the following description and indicated in all the views of the drawings by the same reference characters.

Referring to the drawings, the numeral 1 indicates the main arm of the milking implement, and 2 designates the supplemental arms thereof. The arms 2 are pivoted together at one end to one end of the main arm 1, preferably by a detachable bolt-and-nut connection 3. Each of the supplemental arms is provided near its base with a lug 4, and a spring 5 is connected at its ends to said lugs and extends over one lug around the butts of the arms to the other lug and constitutes a means for moving the arms 2 outwardly away from the arm 1. Each of the arms 2 is further provided with a thumb or finger hold 6 in the form of a loop, as shown. The main or intermediate arm 1, as well as both of the arms 2, are provided near their free ends with angular or offset portions 7, and preferably the extremities of all the arms extend at a slight angle to the main portions thereof, as indicated at 8 in the drawings.

The free end of the main or intermediate arm 1 is provided with two oppositely-extending fingers 9, and a bracket is provided with a shank 10 to be held by screw-threaded engagement to the free end of the main arm 1 between said fingers, and the bracket is provided with two coacting fingers 11, each of which is in substantial alinement with one of the fingers 9. Both the fingers 11 and the fingers 9 are provided with sockets 12, and rollers 13 have their trunnions mounted in said sockets so as to journal the rollers and support them by the main arm 1. The rollers 13 are preferably covered with some soft or resilient material, such as rubber or felt. To the free end of each of the supplemental and pivoted arms 2 there is secured a bracket 14, in which similar rollers 15 are journaled. Thus the device is supplied with four rollers arranged in two operative pairs, of which the adjacent rollers 13 and 15 constitute the members of the same pair. Secured to the main or intermediate arm 1 near its free or outer end is a guide 16, which embraces the said arms 2, and thereby limits the outward movement of said arms. In the operation of this part of the invention the operator grasps the implement in one hand, with the fingers and thumb taking into the loops 6. Then either pair of rollers 13 and 15, or both pairs, may be applied to the teats of the cow and by pressing the two arms 2 together or inwardly, so as to engage the teats and at the same time draw the device downwardly, the milking operation may be accomplished with much less exertion than if the hand alone be used.

As illustrated best in Fig. 3, the main arm 1 is provided with two spaced-apart longitudinally-extending bars 17, secured thereto by rivets or the like and constituting a longitudinal guideway. A funnel 18 is provided with one or more loops 19, one of which is fitted to slide freely in said guideway by receiving one of the bars 17, so that by this means the funnel is connected to the milking tool or implement, and the position of the funnel with respect to the milking-tool may be changed as desired. The funnel 18 is preferably provided with another loop 20, in which a neck-strap 21 is designed to be received, so that the said strap may be passed around the neck of the operator to hold the funnel in the desired position. To assist in the proper support of the funnel, the same is provided with a pivoted brace or strut 22, which is bifurcated at one end to embrace the funnel and is pivoted thereto, as shown. The other end of the brace 22 is formed with a foot 23 intended to bear against the operator's body. The funnel 18 is provided with a cross bar or bridge 24, which is supported in an elevated relation to the upper edge of the funnel, preferably by means of integral vertical supports 24ª, secured at their lower ends to the upper edge of the funnel, as shown. The bridge 24 carries a series of horizontally-extending wire arms 25, extending oppositely from both sides of the same, and each of said wire arms carries a depending flap 26, preferably of rubber cloth or some similar material.

In the practical operation of the assembled and correlated devices the funnel is placed up underneath the udder of the cow and the teats are received between two adjacent depending cloth flaps or aprons 26. The rollers 13 and 15 are then manipulated not against the teats directly, but against the rubber cloth 26, which relieves the teat of any downward pulling or pressure, and thereby affords comfort to the animal. At the same time also, as the person's hands do not come in contact with the milk, the entire operation results in hygienic advantages and goes far to preserve the milk from any contamination whatever.

From the foregoing description, in connection with the drawings, it will be seen that I have provided new and useful milking devices which embody substantially few and simple parts which will be efficient in operation and will result in the advantages heretofore pointed out, both to the cow and to the character of the milk and to the users of the latter.

Having thus described the invention, what is claimed as new is—

1. A milking implement comprising a main arm, an arm pivoted thereto, both of said arms carrying rollers and arranged to receive a teat between them so that pressure may be exerted thereon, and means tending to move said arms apart.

2. A milking implement comprising a main arm, two supplemental arms pivoted to the main arm at opposite sides of the latter, a spring tending to move said pivoted arms away from the main arm, two rollers carried by the main arm, and complementary rollers carried by the pivoted arms.

3. A milking implement comprising a main arm and two supplemental arms pivoted thereto at opposite sides thereof, means tending to move said pivoted arms outwardly away from the main arm, and a guide secured to the main arm and extending around the pivoted arms and arranged to limit the outward movement of the latter.

4. A milking implement comprising a main arm, two pivoted arms connected therewith at one end and each provided with a lug, a spring secured to one lug and passing around the butts of said arms and connected at its other end to the other lug, said spring tending to move said arms outwardly and each of said pivoted arms provided with a finger-hold, and rollers carried by said arms.

5. A milking implement, comprising a main arm and two pivoted arms, all connected together at one end, a bracket secured to the free end of the main arm, two rollers journaled in said bracket and said main arm, and a roller journaled in the free end of each of the other arms.

6. A milking implement comprising pivoted arms, one of which is provided with a longitudinal guideway, and a funnel slidably connected to said arm in the guideway thereof.

7. A milking implement comprising pivoted arms carrying rollers, one of said arms being provided with spaced-apart longitudinal bars, and a funnel provided with a loop receiving one of said bars and retained thereby, the funnel being longitudinally adjustable with respect to the said arm.

8. In a device of the character described, a milking implement designed to exert pressure on the teats, a funnel connected to said implement and longitudinally adjustable with respect to the same, and a neck-strap connected to said funnel.

9. In a device of the character described, a milking implement designed to exert pressure on the teats, a funnel connected to said implement and longitudinally disposed with respect to the same, a neck-strap connected to said funnel, and a body-brace also connected to the funnel.

10. In a device of the character described, a milking implement designed to exert pressure on the teats, a funnel connected to said implement and longitudinally adjustable with respect to the same, a neck-strap connected to the funnel, and a body-brace provided with a bifurcated end pivotally connected to the funnel and also provided at its other end with a foot designed to bear against the body of the operator.

In testimony whereof I affix my signature in presence of two witnesses.

PAUL E. BARTELMUS. [L. S.]

Witnesses:
 FRANK ROACH,
 NINA L. COON.